US011335135B2

(12) United States Patent
Zwissler et al.

(10) Patent No.: US 11,335,135 B2
(45) Date of Patent: May 17, 2022

(54) METHOD AND DEVICE FOR DETERMINING ACCIDENT EFFECTS ON A VEHICLE

(71) Applicant: Robert Bosch GmbH, Stuttgart (DE)

(72) Inventors: Fabian Zwissler, Weinstadt (DE);
Erich Hermann, Kornwestheim (DE);
Sven Goebel, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 131 days.

(21) Appl. No.: 16/099,301

(22) PCT Filed: Mar. 6, 2017

(86) PCT No.: PCT/EP2017/055145
§ 371 (c)(1),
(2) Date: Nov. 6, 2018

(87) PCT Pub. No.: WO2017/190867
PCT Pub. Date: Nov. 9, 2017

(65) Prior Publication Data
US 2019/0197799 A1 Jun. 27, 2019

(30) Foreign Application Priority Data
May 6, 2016 (DE) .......................... 102016207828.3

(51) Int. Cl.
*G07C 5/08* (2006.01)
*G07C 5/00* (2006.01)
(Continued)

(52) U.S. Cl.
CPC ............ *G07C 5/0808* (2013.01); *B60W 40/10* (2013.01); *G07C 5/008* (2013.01); *G07C 5/085* (2013.01);
(Continued)

(58) Field of Classification Search
CPC ........ B60R 2021/0027; B60R 21/0132; B60R 21/00; B60R 21/01; B60R 21/0136;
(Continued)

(56) References Cited

U.S. PATENT DOCUMENTS 5,504,482 A 4/1996 Schreder
5,758,301 A 5/1998 Saito et al.
(Continued)

FOREIGN PATENT DOCUMENTS

| CN | 2716089 Y | 8/2005 |
|---|---|---|
| CN | 1692036 A | 11/2005 |

(Continued)

OTHER PUBLICATIONS

International Search Report for PCT/EP2017/055145, dated Jun. 29, 2017.

*Primary Examiner* — Anthony R Jimenez
(74) *Attorney, Agent, or Firm* — Norton Rose Fulbright US LLP; Gerard Messina

(57) ABSTRACT

A device for determining accident effects on a vehicle, in particular a motor vehicle, comprises: at least one motion sensor that is designed to detect movement data of the vehicle; at least one memory device that is designed to store the movement data detected by the at least one motion sensor; and an evaluation device that is designed to evaluate the movement data detected by the at least one motion sensor in order to detect an accident event.

12 Claims, 2 Drawing Sheets

(51) Int. Cl.
  *G08B 25/01*    (2006.01)
  *B60W 40/10*    (2012.01)
  *G08B 25/08*    (2006.01)
  *G08G 1/00*     (2006.01)
  *H04W 4/90*     (2018.01)
  *B60R 21/00*    (2006.01)

(52) U.S. Cl.
  CPC ........... *G08B 25/016* (2013.01); *G08B 25/08* (2013.01); *G08G 1/205* (2013.01); *H04W 4/90* (2018.02); *B60R 2021/0027* (2013.01)

(58) Field of Classification Search
  CPC .............. B60R 21/013; B60R 21/0004; B60R 21/0006; B60R 21/0009; B60R 21/0011; B60R 21/0023; B60R 21/0027; B60R 21/01013; G08G 1/205; G08G 1/00; G08B 25/016; G08B 25/08; G07C 5/008; G07C 5/085; G07C 5/0808; G07C 5/00; B60W 40/10; H04W 4/90
  USPC ....................................... 701/32.2
  See application file for complete search history.

(56) References Cited

U.S. PATENT DOCUMENTS

| | | | | |
|---|---|---|---|---|
| 6,163,338 A * | 12/2000 | Johnson | ................. | H04N 7/188 348/143 |
| 6,553,295 B1 | 4/2003 | Bauch et al. | | |
| 7,348,895 B2 * | 3/2008 | Lagassey | ............... | G07C 5/008 340/907 |
| 8,849,237 B2 * | 9/2014 | Bourdu | ................. | G08G 1/0967 455/404.1 |
| 8,855,884 B1 * | 10/2014 | Fujitsuka | ............ | B60R 21/0136 701/70 |
| 9,020,690 B2 * | 4/2015 | McKown | ............... | G08B 25/10 701/33.7 |
| 9,349,225 B2 * | 5/2016 | Wanami | ................. | G08G 1/205 |
| 10,919,475 B2 * | 2/2021 | Panigrahi | ............ | B60R 21/0132 |
| 2002/0013649 A1 * | 1/2002 | Anishetty | ........... | B60R 21/0132 701/45 |
| 2014/0375446 A1 | 12/2014 | Wanami et al. | | |
| 2015/0032372 A1 * | 1/2015 | Fuehrer | .................. | G07C 5/008 701/515 |
| 2016/0152211 A1 * | 6/2016 | Owens | .................... | B60R 25/31 348/36 |
| 2017/0210323 A1 * | 7/2017 | Cordova | ............... | G08G 1/0141 |

FOREIGN PATENT DOCUMENTS

| | | |
|---|---|---|
| CN | 1813193 A | 8/2006 |
| CN | 101168358 A | 4/2008 |
| CN | 101238375 A | 8/2008 |
| CN | 101488238 A | 7/2009 |
| CN | 101522477 A | 9/2009 |
| CN | 102325672 A | 1/2012 |
| CN | 102610069 A | 7/2012 |
| CN | 102652078 A | 8/2012 |
| CN | 103640533 A | 3/2014 |
| CN | 103707888 A | 4/2014 |
| DE | 19700353 A1 | 7/1998 |
| DE | 10002536 A1 | 11/2000 |
| DE | 102014107919 A1 | 12/2014 |

* cited by examiner

METHOD AND DEVICE FOR DETERMINING ACCIDENT EFFECTS ON A VEHICLE

FIELD OF THE INVENTION

The present invention relates to a method and a device for determining accident effects on a vehicle.

BACKGROUND INFORMATION

Accidents in road traffic are normally evaluated on the basis of statements by witnesses, of damage determined on the vehicles involved and of traces, e.g. skid marks and paint traces, recorded by the police.

Witness statements are unreliable and damage and traces do not always allow for a clear reconstruction of the course of events of the accident.

It is therefore desirable to improve the evaluation of accidents in road traffic.

SUMMARY

A method for determining accident effects on a vehicle, in particular on a motor vehicle, comprises, according to one exemplary embodiment of the present invention: repeated/continuous determining/measuring and storing of movement data of the vehicle; evaluating the movement data in order to detect an accident event and, upon detecting an accident event, calculating at least one impact angle from the stored movement data.

A device for determining accident effects on a vehicle, in particular a motor vehicle, comprises, in one exemplary embodiment of the present invention: at least one motion sensor that is designed to measure or detect movement data of the vehicle; at least one memory device that is designed to store the movement data detected by the at least one motion sensor, and an evaluation device that is designed to evaluate the movement data detected by the at least one motion sensor in order to detect an accident event.

On the basis of the movement data detected by the at least one motion sensor, it is possible to simplify, accelerate and objectify the reconstruction and evaluation of the course of events of the accident.

In on specific embodiment, the motion data comprise velocity and/or acceleration data of the vehicle, in particular velocity and/or acceleration data in at least two dimensions. In this manner, it is readily possible to reconstruct the movement of the vehicle along a plane (on the road). In particular, it is possible to infer an accident event if the absolute value of the acceleration data exceeds a predefined boundary value. From velocity and/or acceleration data in at least two dimensions, it is possible to determine an impact angle of the vehicle or on the vehicle with high accuracy.

In one specific embodiment, the method comprises storing the measured movement data for 5 min to 30 min, in particular for 10 min to 15 min. In this manner, sufficient data are provided for reconstructing the course of events of the accident. At the same time, the interests of data protection are taken into account since no unnecessarily great amount of data about the vehicle and/or its driver is stored. A local circular buffer in particular may be used for the temporary storage of the data in the motor vehicle.

In one specific embodiment, the method comprises placing an emergency call upon detecting an accident event in order to allow for a quick and targeted initiation of rescue measures. For this purpose, the vehicle may be equipped with a suitable transmitter. The vehicle may be equipped moreover with a position data receiver, in particular a GPS receiver. This makes it possible to transmit together with the emergency call the current position data of the vehicle so that it is possible to guide rescue personnel directly and with high accuracy to the vehicle and/or to the accident location.

In one specific embodiment, the method comprises transmitting the movement data to a server upon detecting an accident event. This makes it possible to store and evaluate the movement data on the server. If other parties involved in the accident are also equipped with a device that detects movement data of the respective vehicle, it is possible to merge the data of these parties involved in the accident, to compare them to one another and to evaluate them jointly. This makes it possible to improve further the quality of the reconstruction of the accident.

DETAILED DESCRIPTION

Figure 1:
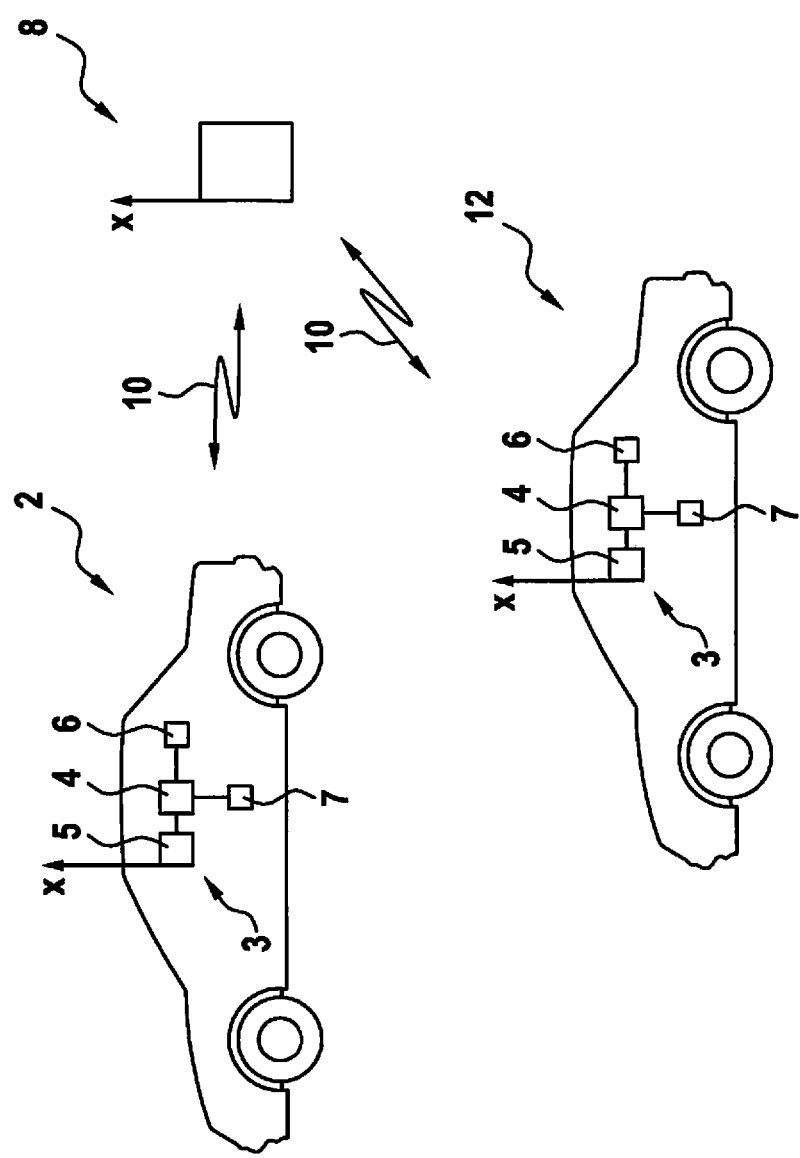
FIG. 1 show in exemplary fashion two motor vehicles 2, 12, which are each developed having a device 3 for determining an accident effect on the respective motor vehicle 2, 12.

Device 3 comprises in particular at least one acceleration and/or velocity sensor 6, which is designed to detect the acceleration and/or the velocity of motor vehicle 2, 4 in at least two dimensions, e.g. front and back as well as left and right. It is also possible to provide a separate acceleration and/or velocity sensor 6 for each dimension.

The data detected by motion sensors 6 are supplied to an evaluation unit 4, which is designed to evaluate the data detected by the motion sensors, in particular in order to detect an accident event.

An accident event may be detected in particular in that the absolute value of the acceleration of the respective motor vehicle 1, 12 exceeds a predefined boundary value. An abrupt braking of vehicle 2, 12, e.g. when striking an obstacle, results in great negative acceleration values; a vehicle 2, 12 being struck by another vehicle 12, 2, e.g. in a rear-end collision, results in great positive acceleration values.

When an accident event has been detected, device 3 is able to place an emergency call via a suitable transmitter 5 in order to guide rescue personnel quickly to the location of the accident. For this purpose, the data transmitted by transmitter 5 may contain in particular current position data, in particular GPS data, of motor vehicle 2, 12.

The data detected by motion sensors 6 are furthermore stored at least temporarily in a memory device 7 provided in motor vehicle 2. Storing the data makes it possible to reconstruct the movement of motor vehicle 2, 12 prior to and/or following the accident event.

It is possible to calculate in particular an impact angle α of motor vehicle 2, 12 from the detected velocity and/or acceleration data. It is also possible to detect and evaluate secondary collisions, which possibly occur after the first accident event.

In this manner it is possible securely, quickly and reliably to reconstruct and evaluate an accident event independently of witness statements and other traces.

After an accident event has been ascertained, the detected movement data of the involved motor vehicles 2, 12 may be transmitted in particular via a suitable data connection 10, for example a mobile telephony network and/or the Internet, to a central server 8, where they are stored, secured and evaluated.

In particular if multiple motor vehicles 2, 12 involved in the accident event are equipped with a device for detecting and storing movement data, it is possible to merge the movement data of all of these motor vehicles 2, 12, to compare them and to evaluate them jointly. In this manner, it is possible to improve the quality and reliability of the evaluation even further.

Figure 2:
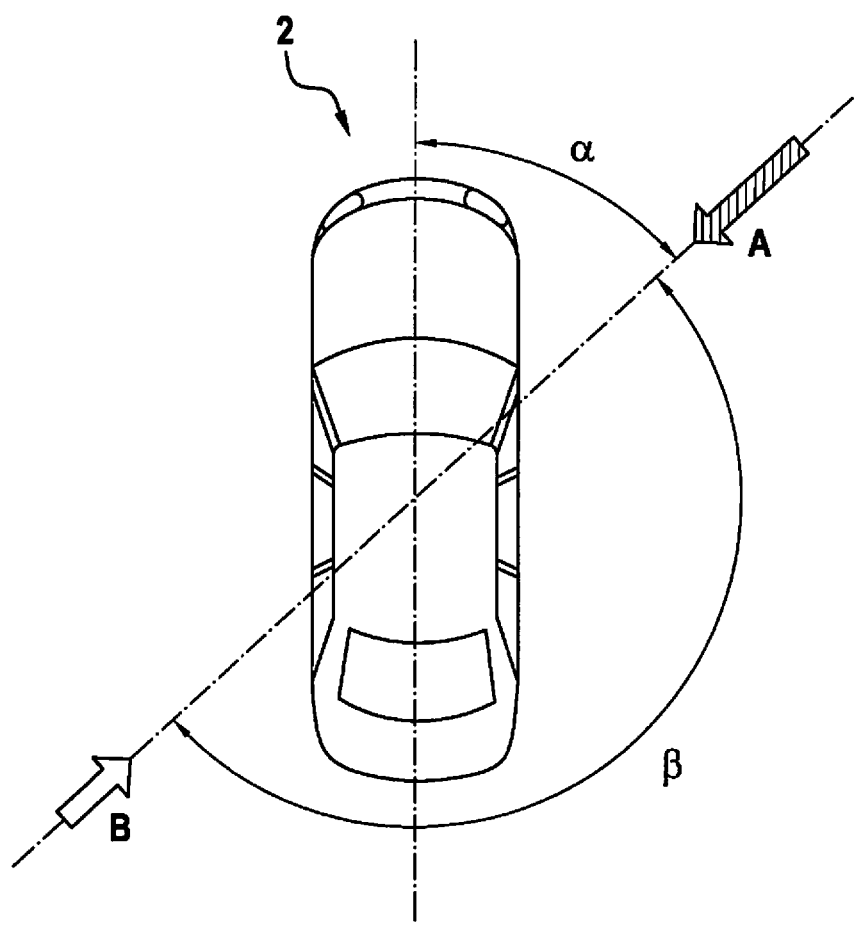
FIG. 2 shows a schematic representation of an accident. Here arrows symbolize the effects on motor vehicle 2.

FIG. 2 shows a schematic representation of an accident. Here arrows symbolize the effects on motor vehicle 2.

Arrow A symbolizes the first collision or the first impact, motor vehicle 2 being struck from the front right. It is possible to determine the direction and the intensity of the impact/collision from the accelerations values produced by this impact.

Arrow B symbolizes a second collision (secondary collision), which results for example from the fact that motor vehicle 2 is pushed by the first collision (arrow A) against an obstacle and strikes this obstacle.

The striking of the obstacle results in a second, normally weaker collision. The direction of the second collision is frequently essentially opposite to the direction of the first collision, i.e., the two arrows A and B are oriented relative to each other at an angle ß of approx. 180°.

If motor vehicle 2 is deflected or rotated between the first and the second collision, the first and the second arrow A, B, i.e., the first and the second collision, may also be oriented at a different angle ß with respect to each other.

The second collision may also be caused in that, following the first collision, e.g. a rear-end collision, another motor vehicle 12 strikes the first motor vehicle 2 involved in the accident.

What is claimed is:

1. A method for determining an accident effect on a vehicle, the method comprising:
   repeatedly determining and storing movement data of the vehicle;
   evaluating the movement data in order to detect an accident event and a secondary accident event, wherein the secondary accident event is due to the accident event causing a second impact of the vehicle against an obstacle; and
   calculating at least one impact angle of an impact occurring external to the vehicle associated with both the accident event and the secondary accident event from the stored movement data following the detecting of the accident event and the secondary accident event,
   wherein the movement data comprise velocity data and acceleration data,
   wherein both the velocity data and the acceleration data are in at least two dimensions,
   wherein the accident event and the secondary accident event are detected based on an absolute value of negative and positive movement data exceeding a predefined boundary value.

2. The method as recited in claim 1, wherein the vehicle is a motor vehicle.

3. The method as recited in claim 1, further comprising reconstructing from the stored movement data a movement sequence of the vehicle at least one of prior to and immediately after the accident event.

4. The method as recited in claim 1, wherein the storing of the movement data includes storing the movement data for 5 min to 30 min.

5. The method as recited in claim 1, wherein the storing of the movement data includes storing the movement data for 10 min to 15 min.

6. The method as recited in claim 1, further comprising placing an emergency call upon detecting the accident event.

7. The method as recited in claim 1, further comprising transmitting the movement data to a server upon detecting the accident event.

8. A device for determining an accident effect on a vehicle, comprising:
   at least one motion sensor for detecting movement data of the vehicle;
   at least one memory device for storing the movement data detected by the at least one motion sensor; and
   an evaluation device for evaluating the movement data detected by the at least one motion sensor in order to detect an accident event and a secondary accident event, wherein the secondary accident event is due to the accident event causing a second impact of the vehicle against an obstacle, and to calculate at least one impact angle of an impact occurring external to the vehicle associated with both the accident event and the secondary accident event from the stored movement data following the detecting of the accident event and the secondary accident event, wherein the movement data comprise velocity data and acceleration data, wherein both the velocity data and the acceleration data are in at least two dimensions,
   wherein the accident event and the secondary accident event are detected based on an absolute value of negative and positive movement data exceeding a predefined boundary value.

9. The device as recited in claim 8, wherein the vehicle is a motor vehicle.

10. The device as recited in claim 8, wherein the at least one motion sensor includes at least one of at least one velocity sensor and at least one acceleration sensor.

11. The device as recited in claim 8, wherein the at least one memory device includes at least one circular buffer for temporarily storing the movement data detected by the at least one motion sensor.

12. The device as recited in claim 8, further comprising a transmitter for, upon the detecting of the accident event, at least one of placing an emergency call and transmitting the movement data detected by the at least one motion sensor to a server.

* * * * *